US010927818B2

(12) United States Patent
Sen et al.

(10) Patent No.: US 10,927,818 B2
(45) Date of Patent: Feb. 23, 2021

(54) SYSTEM AND METHOD FOR WIND BLADE INSPECTION, REPAIR AND UPGRADE

(71) Applicant: General Electric Company, Schenectady, NY (US)

(72) Inventors: Shiraj Sen, Clifton Park, NY (US); Todd William Danko, Niskayuna, NY (US); John Robert Hoare, Latham, NY (US); Charles Burton Theurer, Alplaus, NY (US); Douglas Forman, Niskayuna, NY (US); Judith Ann Guzzo, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/192,807

(22) Filed: Nov. 16, 2018

(65) Prior Publication Data
US 2020/0158091 A1 May 21, 2020

(51) Int. Cl.
*F03D 17/00* (2016.01)
*F03D 80/50* (2016.01)
(Continued)

(52) U.S. Cl.
CPC ............... *F03D 17/00* (2016.05); *B25J 11/00* (2013.01); *F03D 80/50* (2016.05); *G01M 11/081* (2013.01)

(58) Field of Classification Search
CPC .......... F03D 80/50; F03D 17/00; F03D 80/55; F03D 80/40; G01M 11/081; Y02E 10/72;
(Continued)

(56) References Cited

U.S. PATENT DOCUMENTS 6,890,152 B1  5/2005 Thisted
8,171,809 B2 * 5/2012 Fritz ................ G01M 11/081
                                                73/865.8
(Continued)

FOREIGN PATENT DOCUMENTS

DE  102008019680 A1  11/2009
WO     2011161740 A1  12/2011
(Continued)

OTHER PUBLICATIONS

Jeon et al., "Maintenance robot for wind power blade cleaning", 29th International Symposium of Automation and Robotics in Construction, ISARC 2012, Eindhoven, Netherlands, Dec. 1, 2012.
(Continued)

*Primary Examiner* — Randy W Gibson
*Assistant Examiner* — Gedeon M Kidanu
(74) *Attorney, Agent, or Firm* — Dority & Manning, P.A.

(57) ABSTRACT

A system and method for inspecting, repairing and upgrading wind turbine rotor blades of a wind turbine. The system including deploying one or more cables via an unmanned aerial vehicle (UAV), a balloon, a ballistic mechanism or a catapult to position the one or more cables in draping engagement with a portion of the wind turbine. A climbing robot is positioned to ascend the one or more cables and perform a task related to inspecting for indications, repair of indications or upgrading the rotor blade. A slave robot system, disposed at the base location and anchored to the one or more cables, provides modulation of the cables for positioning of the climbing robot relative to the wind turbine as it ascends and descends the one or more cables. After completion of the task, the climbing robot descends the one or more cables and the cables are removed from the wind turbine.

18 Claims, 5 Drawing Sheets

(51) Int. Cl.
    *B25J 11/00*         (2006.01)
    *G01M 11/08*      (2006.01)

(58) Field of Classification Search
    CPC .... Y10S 901/01; Y10S 901/41; Y10S 901/44; Y10S 901/47
    See application file for complete search history.

(56) References Cited

U.S. PATENT DOCUMENTS

| | | | |
|---|---|---|---|
| 8,270,667 | B2 | 9/2012 | Fritz et al. |
| 8,281,442 | B2 | 10/2012 | Eggleston |
| 8,640,558 | B2 * | 2/2014 | Cabuz ............... G01N 21/88 73/865.8 |
| 9,330,449 | B2 | 5/2016 | Newman |
| 9,610,739 | B2 | 4/2017 | Haag et al. |
| 2011/0127109 | A1 * | 6/2011 | Teichert ............ F03D 80/50 182/19 |
| 2011/0318496 | A1 * | 12/2011 | Jensen .............. F03D 80/50 427/427.3 |
| 2012/0325581 | A1 * | 12/2012 | Gunther ............ F03D 80/50 182/129 |
| 2013/0300855 | A1 * | 11/2013 | Fritz ................. H04N 7/18 348/82 |
| 2015/0135459 | A1 * | 5/2015 | Lee ................... F03D 80/55 15/246 |
| 2017/0297589 | A1 * | 10/2017 | Zhou ................. B61C 3/00 |
| 2018/0073266 | A1 * | 3/2018 | Goldenberg ....... G05D 1/0295 |
| 2018/0304462 | A1 * | 10/2018 | Li ..................... B25J 9/1664 |
| 2019/0249649 | A1 * | 8/2019 | Bjerge .............. F03D 80/55 |

FOREIGN PATENT DOCUMENTS

| | | | | |
|---|---|---|---|---|
| WO | WO-2012158042 | A1 * | 11/2012 | ........... B04B 1/00 |
| WO | 2018010749 | A1 | 1/2018 | |

OTHER PUBLICATIONS

S. Hayashi et al., "Moving mechanism for a wind turbine blade inspection and repair robot", 2017 IEEE/SICE International Symposium on System Integration (SII), Taipei, pp. 270-275, Dec. 2017.
"Robot for the Inspection of Wind Turbine Rotor Blades (RIWEA)", Research and Development in Robotic Systems, Retrieved from: https://www.iff.fraunhofer.de/en/business-units/robotic-systems/riwea.html, on Aug. 24, 2018.

* cited by examiner

SYSTEM AND METHOD FOR WIND BLADE INSPECTION, REPAIR AND UPGRADE

BACKGROUND

The embodiments described herein relate generally to wind turbines, and more specifically, to systems and methods for inspecting, repairing and/or upgrading wind turbines.

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy to turn a shaft coupling the rotor blades to a gearbox, or if a gearbox is not used, directly to the generator. The generator then converts the mechanical energy to electrical energy that may be deployed to a utility grid.

Wind turbine blades are typically precisely designed and manufactured to efficiently transfer wind energy into rotational motion, thereby providing the generator with sufficient rotational energy for power generation. Blade efficiency is generally dependent upon blade shape and surface smoothness. Unfortunately, during operation, debris (e.g., dirt, bugs, sea salt, etc.) is collected on the blades, thereby altering the shape and degrading the smoothness. In addition, rocks or other fragments may scratch or erode the blades upon contact. Furthermore, the presence of leading edge erosion and lightning damage may affect blade shape and surface smoothness, thus having an impact on blade efficiency.

Therefore, regular inspection, repair and/or performance upgrades, such as providing protection to the blades in the form of protective coatings, tapes or caps, may serve to maintain wind turbine efficiency. Typically, blade inspection, repair and/or upgrading is performed manually by via rope access, baskets or cranes. For example, using ropes, a blade technician is hoisted to a position adjacent to each blade via suspension from the tower, the hub, or a proximately located crane. The person then inspects, cleans, provides upgrading and/or repairs the blade. For example, the person may take pictures of the blades for later analysis or perform additional tests to determine a current condition of the blade surface. In addition, the person may proceed with any repair or upgrading deemed necessary. However, manual blade maintenance is time consuming and expensive, and is therefore generally performed at longer than desired time intervals. Consequently, wind turbines may operate in an inefficient manner for significant periods. In addition, environmental conditions may preclude the ability for humans to access the wind turbine to perform such tasks.

Accordingly, there is a need for a system and method for inspection, repair and/or upgrade of a wind turbine that requires minimal human intervention. Additionally, an inspection, repair and/or upgrade system and method that can perform in a wide variety of environmental conditions would be desired. Further, there is a need for a system and method for inspection, repair and/or upgrade of a wind turbine that are relatively fast and efficient.

BRIEF DESCRIPTION

Aspects and advantages of the disclosure are set forth below in the following description, or may be obvious from the description, or may be learned through practice of the disclosure.

In one aspect, a system is provided. The system includes one or more cables positioned in draping engagement with a portion of the wind turbine, a climbing robot configured to ascend the one or more cables and at least one slave robot system. Each of the one or more cables is anchored to a base location at opposing ends. The climbing robot is disposed at the base location and anchored to the one or more cables. The at least one slave robot system is configured to position the climbing robot relative to the wind turbine as it ascends the one or more cables.

In another aspect, a method for inspecting, repairing and upgrading a wind turbine is provided. The method includes deploying one or more cables from a base location, positioning a climbing robot to ascend the one or more cables, modulating the one or more cables to position the climbing robot relative to the wind turbine as it ascends the one or more cables, operating the climbing robot to perform at least one of an inspection of the wind turbine for one or more indications, repair of the one or more indications and upgrade of the wind turbine, modulating the one or more cables to position the climbing robot relative to the wind turbine as it descends the one or more cables and removing the one or more cables from the wind turbine. The one or more cables are deployed to drape over a portion of the wind turbine.

In yet another aspect, a method for inspecting, repairing and upgrading a rotor blade of a wind turbine is provided. The method includes deploying one or more cables from a base location via a delivery component comprising one of an unmanned aerial vehicle (UAV), a balloon, a ballistic mechanism and a catapult, positioning a climbing robot to ascend the one or more cables, modulating the one or more cables to position the climbing robot relative to the rotor blade as it ascends the one or more cables, operating the climbing robot to perform at least one of an inspection of the rotor blade for one or more indications, repair of the one or more indications and upgrade of the rotor blade, modulating the one or more cables to position the climbing robot relative to the rotor blade as it descends the one or more cables and removing the one or more cables from the wind turbine. The one or more cables are deployed to drape over a portion of the wind turbine. The modulating of the one or more cables as the climbing robot ascends and descends includes anchoring the one or more cables to at least one slave robot system disposed at the base location, the at least one slave robot system configured to position the climbing robot relative to the wind turbine as it ascends and descends the one or more cables.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

Corresponding reference characters indicate corresponding parts throughout the several views of the drawings.

DETAILED DESCRIPTION OF THE DISCLOSURE

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may minimize the need for human intervention in the inspection, repair and/or upgrade of wind turbines. As a result, the disclosed system and method may significantly lower costs by enabling certain inspection, repair and/or upgrade operations to be robotically performed.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a land-based wind turbine, for purposes of illustration, one of ordinary skill in the art will readily appreciate that embodiments of the present disclosure may be applied to any wind turbine structure, such as offshore wind turbines, and is not intended to be limiting to land based structures.

Figure 1:
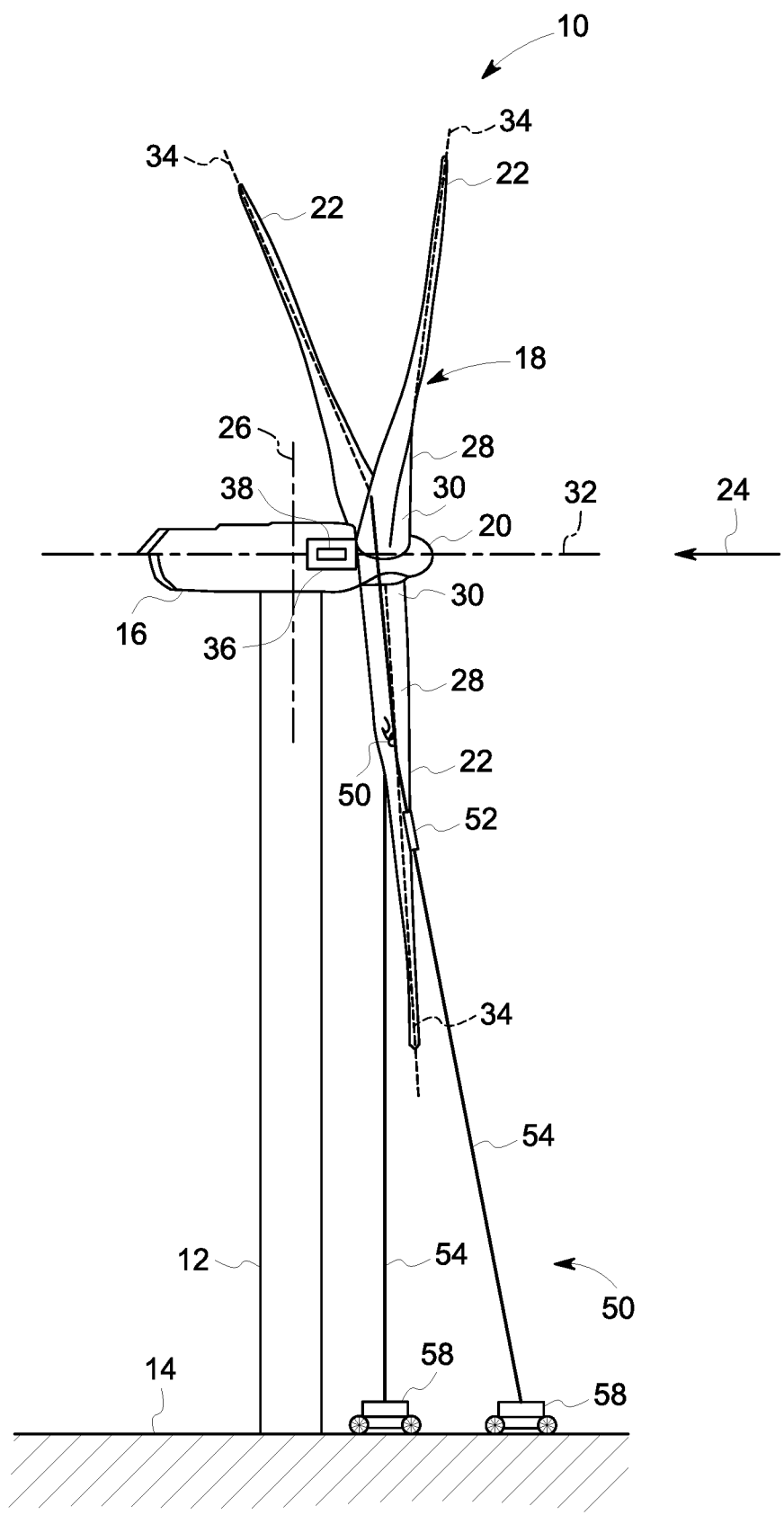
FIG. 1 is a side schematic view of an exemplary wind turbine, in accordance with one or more embodiments of the present disclosure.

Referring now to the drawings, wherein identical numerals indicate the same elements throughout the figures, FIG. 1 provides a schematic side view of an exemplary wind turbine 10. In the exemplary embodiment, wind turbine 10 is a horizontal-axis wind turbine. Alternatively, the wind turbine 10 may be a vertical-axis wind turbine. In the exemplary embodiment, the wind turbine 10 includes a tower mast 12 extending from and coupled to a supporting surface 14. The tower mast 12 may be coupled to the supporting surface 14 with a plurality of anchor bolts or via a foundation mounting piece (neither shown), for example. A nacelle 16 is coupled to the tower mast 12, and a rotor 18 is coupled to the nacelle 16. The rotor 18 includes a rotatable hub 20 and a plurality of rotor blades 22 coupled to the hub 20. In the exemplary embodiment, the rotor 18 includes three rotor blades 22. Alternatively, the rotor 18 may have any suitable number of rotor blades 22 that enables the wind turbine 10 to function as described herein. The tower mast 12 may have any suitable height and/or construction that enables the wind turbine 10 to function as described herein.

The rotor blades 22 are spaced about the rotatable hub 20 to facilitate rotating the rotor 18, thereby transferring kinetic energy from a wind force 24 into usable mechanical energy, and subsequently, electrical energy. The rotor 18 and the nacelle 16 are rotated about the tower mast 12 on a yaw axis 26 to control a perspective, or azimuth angle, of the rotor blades 22 with respect to the direction of the wind 24. The rotor blades 22 are mated to the hub 20 by coupling a blade root portion 28 to the rotatable hub 20 at a plurality of load transfer regions 30. Each load transfer region 30 has a hub load transfer region and a blade load transfer region (both not shown in FIG. 1). Loads induced to the rotor blades 22 are transferred to the hub 20 via load the transfer regions 30. Each rotor blade 22 also includes a blade tip 32.

In the exemplary embodiment, the rotor blades 22 have a length of between approximately 30 meters (m) (99 feet (ft)) and approximately 120 m (394 ft). Alternatively, the rotor blades 22 may have any suitable length that enables the wind turbine 10 to function as described herein. For example, the rotor blades 22 may have a suitable length less than 30 m or greater than 120 m. As wind 24 contacts the rotor blade 22, blade lift forces are induced to the rotor blade 22 and rotation of the rotor 18 about an axis of rotation 32 is induced as the blade tip 22 is accelerated.

As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position. A pitch angle (not shown) of the rotor blades 22, i.e., an angle that determines the perspective of the rotor blade 22 with respect to the direction of the wind 24, may be changed by a pitch assembly (not shown in FIG. 1). Increasing a pitch angle of rotor blade 22 decreases blade deflection by reducing aero loads on the rotor blade 22 and increasing an out-of-plane stiffness from the change in geometric orientation. The pitch angles of the rotor blades 22 are adjusted about a pitch axis 34 at each rotor blade 22. In the exemplary embodiment, the pitch angles of the rotor blades 22 are controlled individually. Alternatively, the pitch angles of the rotor blades 22 are controlled simultaneously as a group.

During operation of wind turbine 10, the pitch assembly may change the pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 38 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

The wind turbine 10 of the present disclosure may, during fabrication, assembly, operation, or otherwise, incur various indications 30. An indication 40 may be, for example, a crack, erosion, fouling, lightening damage or other defect in the wind turbine 10, such as in a rotor blade 22, tower 12, or other component of the wind turbine 10. The indication 40, if not recognized and repaired, or the blade, or portions thereof, upgraded, may damage the various components of the wind turbine 10 or cause them to fail. For example, indications 40 in high load areas of the rotor blades 22 may, in some instances, need to be repaired before growing past approximately 50 millimeters ("mm") in length, while indications 40 in low load areas of the rotor blades 22 may need to be repaired before growing past approximately 3 meters ("m") in length.

To provide such inspection for indications, repair of indications and/or upgrade to the wind turbine, disclosed herein is a system 50 that provides for a climbing robot 52 to access the blade 22 or other part of the wind turbine 10, utilizing a vertical, external, rappelling system 54, generally comprised of one or more cables 56, to position the climbing robot 52 at the location for inspection, repair and/or upgrade of the indication 40. The system 50 further includes one or more coordinated base located robots 58 running in slave mode that ensure that the climbing robot 52 is able to apply the right contact forces at the right position to ensure task performance. The system 50 may perform a variety of tasks to provide fast, efficient, accurate inspection, repair and/or upgrade of the wind turbine 10. Such tasks may include, but are not limited to, real-time inspection, cleaning, coating application, filler, or the like.

Figure 2:
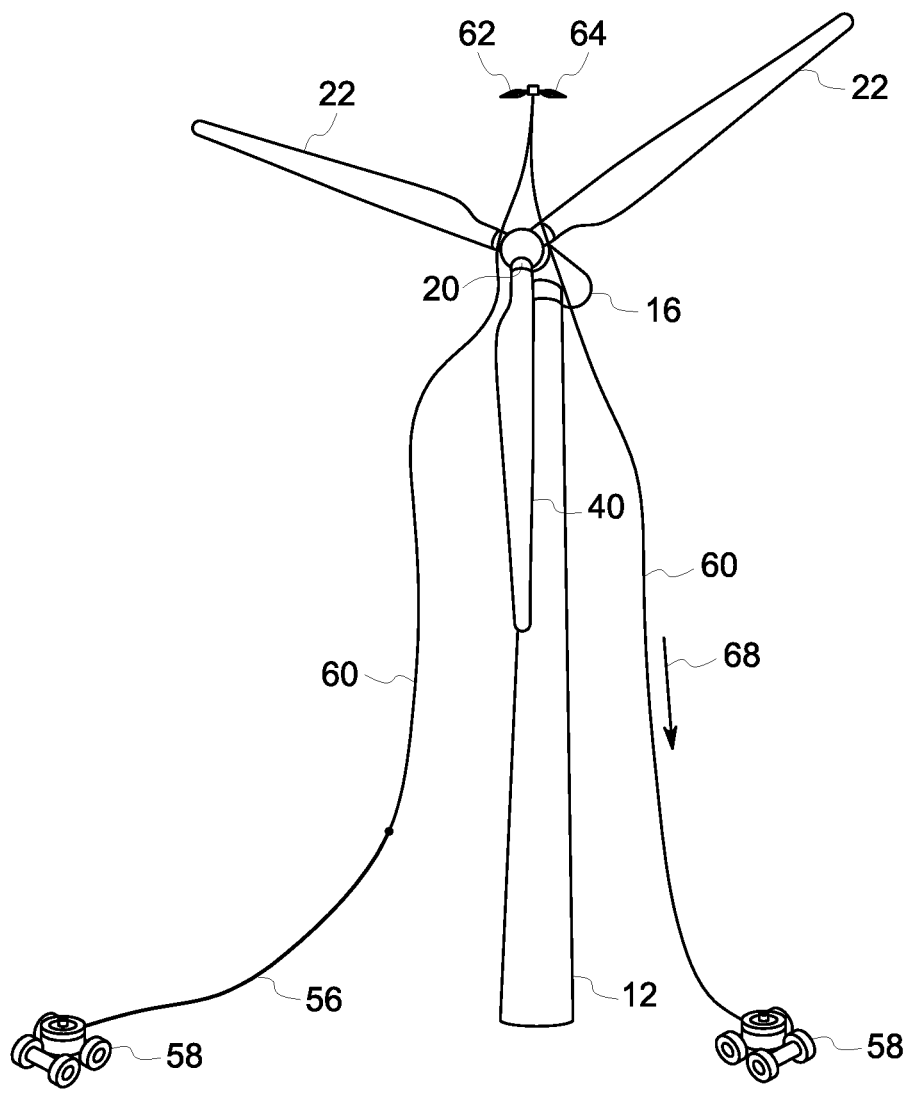
FIG. 2 is a perspective view of one embodiment of the system for wind blade inspection, repair and upgrade during initial deployment, in accordance with one or more embodiments of the present disclosure.
Figure 3:
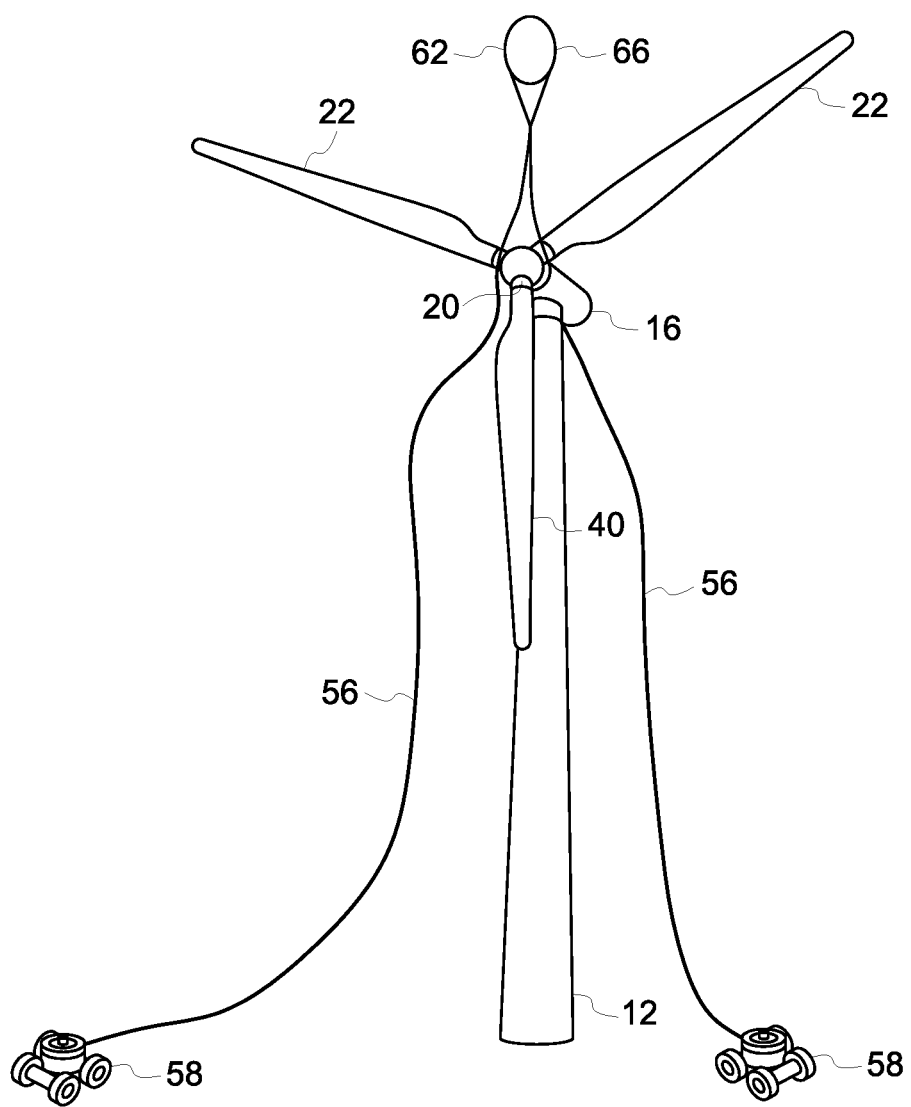
FIG. 3 is a perspective view of another embodiment of the system for wind blade inspection, repair and upgrade during initial deployment, in accordance with one or more embodiments of the present disclosure.
Figure 4:
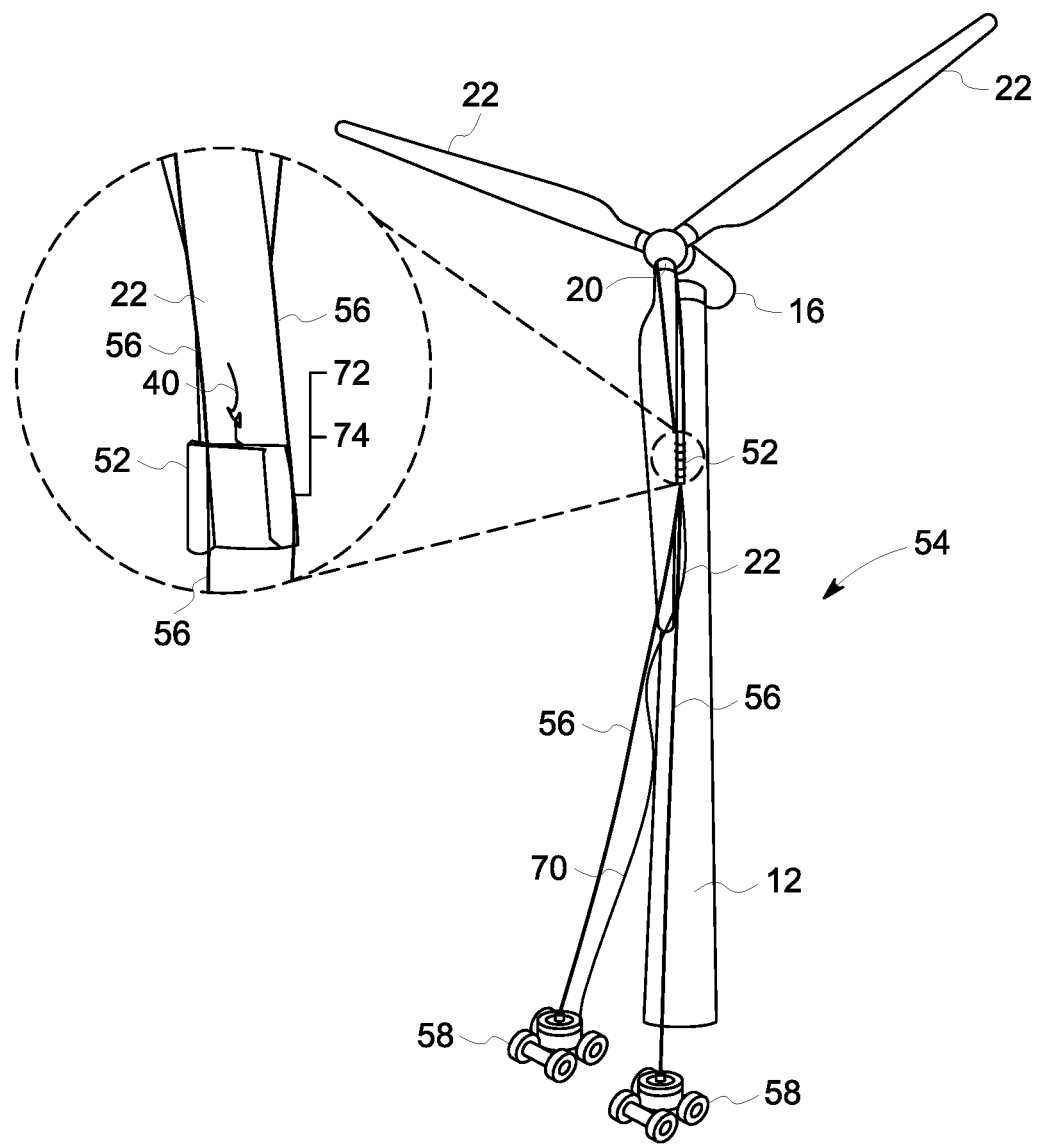
FIG. 4 is a perspective view of the system for wind blade inspection, repair and upgrade during use, in accordance with one or more embodiments of the present disclosure.
Figure 5:
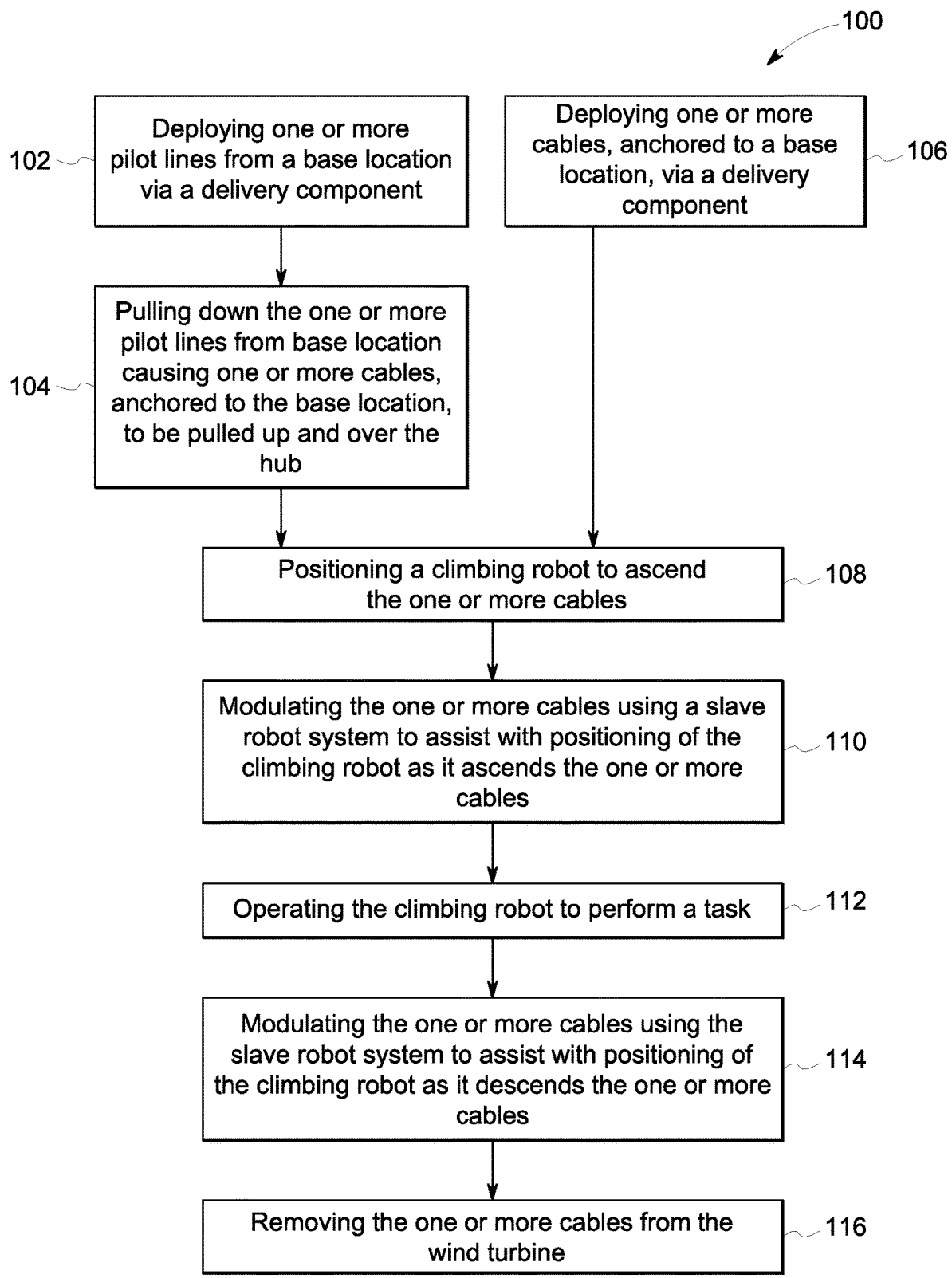
FIG. 5 illustrating an exemplary method for wind blade inspection, repair and upgrade, in accordance with one or more embodiments of the present disclosure.

Thus, referring now to FIGS. 2 and 3, the system 50 may be provided for inspecting, repairing and/or upgrading the wind turbine 10. In one embodiment, the system 50 includes initial deployment of one or more pilot lines 60 to aid in placement of the vertical, external, rappelling system 54 (FIG. 4). In an alternative embodiment, the system 50 may include initial deployment of the one or more cables 56 on the wind turbine 10, that form the vertical, external, rappelling system 54, without the use of pilot lines. As illustrated in FIG. 2, the system includes a delivery component 62, such as an unmanned aerial vehicle (UAB) 64, such as a drone (FIG. 2), a balloon 66, such as, but not limited to, a helium balloon, a hot air balloon, a hydrogen balloon (FIG. 3), a ballistic mechanism, a catapult, or any other delivery component that is capable of deploying the one or more pilot lines 58 or the one or more cables 56 relative to the wind turbine 10.

Referring more specifically to FIG. 2, illustrated is the deployment by the delivery component 62 of the one or more pilot lines 60. The delivery component 62, and more particularly the drone 64, is deployed in a manner to position the pilot guiding lines 60 over the nacelle 16, and more specifically the hub 20, of the wind turbine 10. In an alternate embodiment, the pilot lines 60 may be deployed by balloon, ballistic mechanism, a catapult, or any other delivery component capable of performing such deployment. In an embodiment, the pilot lines 70 are anchored by the one or more coordinated base located robots 58 and weighted in a manner to provide for positioning about the wind turbine 10. In an embodiment the one or more pilot lines 60 are positioned in a draping engagement about the hub 20. In another embodiment the one or more pilot lines 60 are positioned in a draping engagement about the nacelle 16. In yet another embodiment the one or more pilot lines 60 are positioned in a draping engagement about the rotor blade 22, or any other component of the wind turbine 10. By positioning the pilot lines 70 about a component of the wind turbine 10 in such a manner, and by doing so through the use of the delivery component 62, human intervention in the form of a climber that anchors the one or more cables 56 to the wind turbine 10, such as to the top of the nacelle 16, is not required.

In the embodiment of FIG. 2, one or more cables 56 are coupled to an end portion of the pilot lines 70. Subsequent to positioning of the pilot lines 60 of FIG. 2, the pilot lines 60 are pulled down to the base location, in a direction as illustrated by arrow 68, such that the one or more cables 56 coupled thereto are pulled up, in a pulley-like manner. The one or more cables 56 are configured to traverse the wind turbine 10 in a similar draping engagement as the one or more pilot lines 60. For example, in one embodiment, the one or more cables 56 may be configured to traverse the hub 20 or any other components of the wind turbine 10, such as the rotor blades 22 or the nacelle 16. In an embodiment, after positioning the one or more cables 56 as desired, the one or more cables 56 are anchored to the one or more coordinated base located robots 58

In the embodiments of FIG. 3 illustrated is the deployment of the one or more cables 60 by the delivery component 62, without the use of pilot lines as in FIG. 2. As illustrated, the delivery component 62, and more particularly in this particular embodiment, a balloon 66 is deployed in a manner to position the one or more cables 60 over a component of the wind turbine 10, such as the nacelle 16, the hub 20, or rotor blade 22. In an embodiment, the one or more cables 60 are anchored by the one or more coordinated base located robots 58 and weighted in a manner to provide for positioning about the wind turbine 10. By positioning the one or more cables 60 about the wind turbine 10 in such a manner, and by doing so through the use of the delivery component 62, human intervention in the form of a climber that anchors the one or more cables 56 to the wind turbine 10, such as to the top of the nacelle 16, is not required.

Referring now to FIG. 4, illustrated is the system 50 subsequent to positioning of the one or more cables 56 according to the embodiment of FIG. 2 or 3. As illustrated, the climbing robot 52 ascends the vertical, external, self-rappelling system 54, and more particularly, the one or more cables 56 to the portion of the wind turbine 10, such as blade 22, where the indication 40 is present. As the climbing robot 52 ascends, the one or more cables 56 are modulated, such as by adjusting tension on the cables to produce desirable forces through pulling, moving, steering, or the like, using the one or more coordinated base located robots 58 as a slave-system to assist in positioning the climbing robot 52 proximate the blade 22, and more particularly, the indication 40 on the blade 22. In an alternate embodiment, the one or more cables 56 are modulated using a manually driven ground base system.

As illustrated in FIG. 4, in an embodiment, the climbing robot 52 is tethered to the base location with a tether cable 70 configured to provide one or more of power, communications, grounding, supplies, distance calculation from root of blade, or the like. More particularly, the tether cable 70 may provide any suitable components or systems for operating the climbing robot 52.

Subsequent to reaching the desired location for inspection, repair or upgrade of the blade 22, the climbing robot 52 performs the tasks on the blade 22. In an embodiment, during this task performance the climbing robot 52 is configured to perform continuous or incremental movement along the blade 22 with use of the vertical, external, self-rappelling system 54. Upon completion of the tasks, the climbing robot 52 descends the vertical, external, self-rappelling system 54, and more particularly, the one or more cables 56. Similar to during the ascending of the climbing robot 52, the one or more cables 56 are modulated using the one or more coordinated base located robots 58, as a slave-system to assist the climbing robot 52 or manually modulated as previously described. The one or more cables 56 are subsequently removed from the wind turbine 10 in a simple pulling action by the one or more coordinated base located robots 58 or human intervention.

In an embodiment, the climbing robot 52 may include a drive mechanism 72. The drive mechanism 72 may be configured to drive the climbing robot 52. For example, the drive mechanism 72 may be coupled to a traction apparatus 74, and may drive the traction apparatus 74, causing the climbing robot 52 to traverse the vertical, external, self-rappelling system 54. Alternatively, the drive mechanism 72 may be independent of the traction apparatus 74 and may independently cause the climbing robot 52 to traverse the vertical, external, self-rappelling system 54. The drive mechanism 72 may be, for example, a direct drive mechanism including a motor, or may include a gearbox, belt, chain, rack and pinion system, or any other suitable drive component.

The vertical, external, self-rappelling system 54, and more particularly the climbing robot 52 and/or the one or more coordinated base located robots 58 may further include a processor 76 for operating the climbing robot 52. The climbing robot 52, such as the drive mechanism 72, the traction apparatus 74, and/or any other components or systems of the climbing robot 52, may be communicatively coupled to the processor 76. The communicative coupling of the various components of the climbing robot 52 and the processor 76 may be through a physical coupling, such as through a wire or other conduit or umbilical cord, including tether cable 70, or may be a wireless coupling, such as through an infra-red, cellular, sonic, optical, or radio frequency-based coupling. In an embodiment, the processor 76 may be incorporated into a suitable control system (not shown), such as a handheld remote, a personal digital assistant, cellular telephone, a separate pendant controller, or a computer. The climbing robot 52 may be operated manually through the processor 76 by a human operator or may be partially or fully automated through the use of suitable programming logic incorporated into the processor 76.

The climbing robot 52 may be configured to inspect for indications 40 and/or repair indications 40, provide upgrades to the blades 22, and any other wind turbine 10 components, such as the tower 12. For example, in an exemplary embodiment, the climbing robot 52 may traverse the wind turbine 10 via the vertical, external, self-rappelling system 54, to a blade 22 and inspect the blade 22 for indications 40. The climbing robot 52 may thereafter perform task so repair the indication 40 and/or report the indication 40 for future repair.

In an embodiment, the climbing robot 52 may include any variety of components or systems for inspecting, repairing and/or upgrading the wind turbine 10. For example, the climbing robot 52 may, in exemplary embodiments, include a locating apparatus to determine the location of an indication 40 detected on the rotor blade 22 by providing information regarding the location of the climbing robot 52 when the indication 40 is detected, and converting this information to information regarding the respective location of the indication 40 along the length of the rotor blade 22. The climbing robot 52 may, in exemplary embodiments, include a measuring apparatus configured to measure the size of any indications 40 detected on the wind turbine 10, such as on a rotor blade 22. The climbing robot 52 may, in exemplary embodiments, include a metering device. The metering device may indicate the distance that the climbing robot 52 is from the rotatable hub 20, the ground, or any other wind turbine 10 component, when the indication 40 is detected. The climbing robot 52 may, in exemplary embodiments, include a global positioning system ("UPS") device or transmitter configured to utilize location data to determine the location of the climbing robot 52, when the indication 40 is located.

To perform repair and/or upgrade to the wind turbine 10, the climbing robot 52 may, in exemplary embodiments, be configured to provide perform tasks, including, but not limited to, sanding, filling, leading edge tape application, coating, or the like to the indications 40 on the wind turbine 10, such as on the blade 22.

In an exemplary embodiment, the vertical, external, self-rappelling system 54 of the present disclosure may include safety features connecting the climbing robot 52 to the wind turbine 10 or tether cable 70. In the event that the climbing robot 52, while traversing the vertical, external, self-rappelling system 54, loses traction and becomes disengaged from the wind turbine 10, and/or the cables 56, the safety features may prevent the climbing robot 52 from falling to the ground and becoming damaged or broken, a safety risk or damaging the tower.

In further exemplary embodiments, the safety features may include features that reduce the apparent weight of the climbing robot 52. For example, the safety features may include, for example a tensioning system, such as a spring tensioning system, or a counterweight for offsetting the weight of the climbing robot 52. Further, the tensioning system or counterweight may, in some embodiments, increase the force applied to offset the weight of the climbing robot 52 as the climbing robot 52 moves up the cables 56 or to offset the weight of any tethered cables, such as tether cable 70, including wires, conduits, or additional umbilical cords that are associated with the vertical, external, self-rappelling system 10.

The present disclosure is further directed to a method 100 for inspecting, repairing and/or upgrading a wind turbine for indications, such as the blade or other components of the wind turbine for indications. The method may include, for example, deploying one or more pilot lines from a base location via a delivery component in a manner to drape, or position, the pilot lines over the wind turbine, in an initial step 102. In an embodiment, the one or more pilot lines may be positioned about the nacelle, the hub, or a rotor blade of the wind turbine. In a step 104, the one or more pilot lines are pulled down from base location causing one or more cables coupled to the pilot lines and anchored to the base location, to be pulled up and over the wind turbine. Alternatively, in a step 106, the one or more cables, anchored to a base location, are deployed from the base location via a delivery component and draped over the wind turbine, without the use of pilot lines.

Next, in a step 108, a climbing robot ascends the one or more cables while tethered to the base location. The one or more cables are modulated at the base location using a slave robot system to help position the climbing robot as it ascends the one or more cables, in a step 110. The climbing robot continues to ascend the cables until such time it reaches the location of the indication on the wind turbine, such as on a blade. The climbing robot next performs one or more tasks on the blade, in a step 112, that may include inspecting the blade for indications, repairing indications and/or upgrading the blade. Subsequent to completion of the task, the climbing robot descends the cables in a step 114. During this step, the one or more cables are modulated at the base location using the slave robot system to help position the climbing robot as it descends the one or more cables. Upon the climbing robot reaching the base location, the one or more cables are removed or disengaged from the wind turbine, in a step 116.

As discussed above, the wind turbine 10 of the present disclosure may include a tower 12 and at least one rotor blade 22. In exemplary embodiments, the vertical, external, self-rappelling system 54 may be deployed and operated to inspect, repair and/or upgrade the at least one rotor blade 22 for indications 40.

For example, the vertical, external, self-rappelling system 54 may be provided on the wind turbine 10, such as on the tower 12, or alternatively on a rotor blade 22 or other wind turbine 10 component. As discussed above, the vertical, external, self-rappelling system 54 includes a climbing robot 52 configured to traverse the one or more cables 56 of the vertical, external self-rappelling system 54, positioning the climbing robot 52 relative to the wind turbine 10, such as the rotor blade 22, or other wind turbine 10 component, to perform inspection, repair and/or upgrades tasks, as discussed above.

The vertical, external, self-rappelling system 54 of the present disclosure may be operated to inspect, repair and/or upgrade the wind turbine 10, and more particularly the rotor blade 22, or alternatively the tower 12 or other wind turbine 10 component, for indications 40.

In exemplary embodiments, the method includes draping one or more cables 56 over the hub 20 or nacelle 16 of the wind turbine, with anchoring of the one or more cables 56 at a base location. The method may include deploying one or more pilot lines 60 via unmanned aerial vehicle, balloon, ballistics, or some other method, to aid in draping the one or more cables 56. Alternatively, the one or more cables 56 may be deployed via unmanned aerial vehicle, balloon, ballistic device, or some other method without the use of any pilot lines.

In further exemplary embodiments, the method of the present disclosure may include various steps involving positioning the rotor blade 22 prior to positioning of the vertical, external, self-rappelling system 54. For example, the method may include the step of rotating the rotor blade 22 such that the rotor blade 22 is approximately parallel to and proximate the tower 12. For example, the rotor blade 22 may be rotated about the axis of rotation 32 (FIG. 1) until the rotor blade 22 is in a generally downward position. The rotor blade 22 may then be rotated and positioned such that it is approximately parallel to the tower 12. Thus, the vertical, external, self-rappelling system 54 disposed on the wind turbine 10 may be in an optimal position for inspecting the rotor blade 22.

The method may further include the step of rotating the nacelle 16 about the yaw axis 26. For example, while the vertical, external, self-rappelling system 54 of the present disclosure may advantageously inspect, repair and/or upgrade a rotor blade 22 in a wide variety of environmental conditions, the use of incident light to inspect the rotor blade 22 may still be beneficial. Thus, if incident light is available, or if other desired conditions are present, the nacelle 16 may be rotated about the yaw axis 26 to optimally position the rotor blade 22 as desired.

The method may further include the step of rotating the rotor blade 22 about the pitch axis 34. For example, a rotor blade 22 of the present disclosure may include a pressure side, a suction side, a leading edge, and a trailing edge, as is known in the art. Each side and edge of the rotor blade 22 must be inspected, repaired and/or upgraded. To achieve such, the side or edge must be in the line-of-sight of the climbing robot 52. For example, when the rotor blade 22 is positioned such that the pressure side, leading edge, and trailing edge are in the line-of-sight of the climbing robot 52 that has ascended the one or more cables 56, the suction side may not be analyzed. Thus, during the inspection, repair and/or upgrade of the rotor blade 22 by the climbing robot 52, after analyzing portions of the rotor blade 22 that are in the line-of-sight of the climbing robot 520, the rotor blade 22 may be rotated about the pitch axis 34 such that other portions of the rotor blade 22 are placed in the line-of-sight of the climbing robot 52. The climbing robot 52 may then continue to inspect, repair and/or upgrade the rotor blade 22.

It should be understood that the vertical, external, self-rappelling system and method of the present disclosure may be optimized for fast, efficient inspection, repair and/or upgrade of a wind turbine 10. For example, the vertical, external, self-rappelling system and method of the present disclosure may be utilized to quickly and efficiently inspect, repair and/or upgrade of the various rotor blades 22 of a wind turbine 10. Additionally, it should be understood that the vertical, external, self-rappelling system and method of the present disclosure eliminate human intervention and reduce human errors previously associated with the inspection, repair and/or upgrade of wind turbines 10. Further, it should be understood that the vertical, external, self-rappelling system and method of the present disclosure can perform in a wide variety of environmental conditions.

Exemplary embodiments of the system for inspecting, repairing and upgrading wind turbine rotor blades of a wind turbine, and more particularly the vertical, external, self-rappelling system are described in detail above. The vertical, external, self-rappelling system is not limited to use with the specified land-based wind turbines described herein, but rather, the vertical, external, self-rappelling system can be utilized with offshore wind turbines. In such an off-shore application, the base location may include a manned or unmanned ocean-based vehicle, or the like. Moreover, the present disclosure is not limited to the embodiments of the vertical, external, self-rappelling system described in detail above. Rather, other variations of the vertical, external, self-rappelling system embodiments may be utilized within the spirit and scope of the claims.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system comprising:
   one or more cables positioned in draping engagement with a portion of a wind turbine, each of the one or more cables anchored to a base location at opposing ends;
   a climbing robot configured to ascend the one or more cables; and
   a slave robot system disposed at the base location, the slave robot system configured to position the climbing robot relative to the wind turbine as it ascends the one or more cables, wherein the slave robot system comprises a plurality of coordinated base located robots each anchored to the one or more cables and configured to modulate the one or more cables to produce forces in the one or more cables and assist in positioning the climbing robot relative to the wind turbine,
   wherein at least one of the climbing robot and the plurality of coordinated base located robots is configured to communicate with and control the others of the climbing robot and the plurality of coordinated base located robots.

2. The system as claimed in claim 1, wherein the climbing robot is further configured to at least one of inspect a rotor blade of the wind turbine for an indication, repair the indication and upgrade the rotor blade of the wind turbine.

3. The system as claimed in claim 1, wherein the one or more cables are positioned in draping engagement with at least one of a hub, a nacelle and a rotor blade of the wind turbine.

4. The system as claimed in claim 1, wherein the climbing robot includes a traction apparatus configured to engage at least one of the one or more cables and the wind turbine.

5. The system as claimed in claim 1, wherein the climbing robot includes a drive mechanism configured to drive the climbing robot on the one or more cables.

6. The system as claimed in claim 1, further comprising a tether cable anchored to the climbing robot and the base location.

7. The system as claimed in claim 6, wherein the tether cable is anchored to the base location via the slave robot system.

8. The system as claimed in claim 6, wherein the tether cable is configured to provide one or more of power, communications, grounding, supplies and distance calculations.

9. The system as claimed in claim 6, wherein the tether cable couples the climbing robot to at least one of the wind turbine and the one or more cables, the tether cable configured to reduce the apparent weight of the climbing robot.

10. A method for inspecting, repairing and upgrading a wind turbine, the method comprising:
    deploying one or more cables from a base location, the one or more cables deployed to drape over a portion of the wind turbine, each of the one or more cables anchored to a slave robot system disposed at a base location at opposing ends, the slave robot system including a plurality of coordinated base located robots each anchored to the one or more cables at the opposing ends, wherein the plurality of coordinated base located robots are configured to communicate with each other and with the climbing robot;
    positioning a climbing robot to ascend the one or more cables;
    modulating, using the plurality of coordinated base located robots, the one or more cables to position the climbing robot relative to the wind turbine as it ascends the one or more cables;
    operating the climbing robot to perform at least one of an inspection of the wind turbine for one or more indications, repair of the one or more indications and upgrade of the wind turbine;
    modulating, using the plurality of coordinated base located robots, the one or more cables to position the climbing robot relative to the wind turbine as it descends the one or more cables; and
    removing the one or more cables from the wind turbine.

11. The method of claim 10, wherein deploying one or more cables from a base location via a delivery component comprises deploying one or more pilot lines from a base location, the one or more pilot lines coupled to the one or more cables.

12. The method of claim 10, wherein the delivery component is one of an unmanned aerial vehicle (UAV), a balloon, a ballistic mechanism and a catapult.

13. The method of claim 10, wherein the climbing robot includes a traction apparatus configured to engage the one or more cables and a drive mechanism configured to drive the climbing robot on the one or more cables.

14. The method of claim 10, further comprising rotating a rotor blade of the wind turbine such that the rotor blade is approximately parallel to and proximate the tower.

15. A method for inspecting, repairing and upgrading a rotor blade of a wind turbine, the method comprising:
    deploying one or more cables from a base location via a delivery component comprising one of an unmanned aerial vehicle (UAV), a balloon, a ballistic mechanism and a catapult, the one or more cables deployed to drape over a portion of the wind turbine, each of the one or more cables anchored to a slave robot system disposed a base location at opposing ends, the slave robot system includes a plurality of coordinated base located robots each anchored to the one or more cables at the opposing ends;
    positioning a climbing robot to ascend the one or more cables;
    modulating, using the plurality of coordinated base located robots, the one or more cables to position the climbing robot relative to the rotor blade as it ascends the one or more cables, wherein the plurality of coordinated base located robots are configured to communicate with each other and with the climbing robot;
    operating the climbing robot to perform at least one of an inspection of the rotor blade for one or more indications, repair of the one or more indications and upgrade of the rotor blade;
    modulating, using the plurality of coordinated base located robots, the one or more cables to position the climbing robot relative to the rotor blade as it descends the one or more cables, the plurality of coordinated base located robots positioning the climbing robot relative to the wind turbine as it ascends and descends the one or more cables; and
    removing the one or more cables from the wind turbine.

16. The method of claim 15, wherein deploying one or more cables from a base location via a delivery component comprises deploying one or more pilot lines from a base location, the one or more pilot lines coupled to the one or more cables.

17. The method of claim 15, wherein the climbing robot comprises a traction apparatus configured to engage the one or more cables and a drive mechanism configured to drive the climbing robot on the one or more cables.

18. The method of claim 15, further comprising rotating a rotor blade of the wind turbine such that the rotor blade is approximately parallel to and proximate the tower.

\* \* \* \* \*